United States Patent
Oh (10) Patent No.: US 9,802,567 B2
(45) Date of Patent: Oct. 31, 2017

(54) CURTAIN AIRBAG FOR VEHICLE

(71) Applicant: Hyundai Motor Company, Seoul (KR)

(72) Inventor: Chang Jin Oh, Seoul (KR)

(73) Assignee: Hyundai Motor Company, Seoul (KR)

( * ) Notice: Subject to any disclaimer, the term of this patent is extended or adjusted under 35 U.S.C. 154(b) by 30 days.

(21) Appl. No.: 15/137,094

(22) Filed: Apr. 25, 2016

(65) Prior Publication Data

US 2017/0166158 A1    Jun. 15, 2017

(30) Foreign Application Priority Data

Dec. 9, 2015  (KR) .................. 10-2015-0174749

(51) Int. Cl.
*B60R 21/232* (2011.01)
*B60R 21/2338* (2011.01)
*B60R 21/237* (2006.01)
*B60R 21/231* (2011.01)
*B60R 21/235* (2006.01)

(52) U.S. Cl.
CPC .......... *B60R 21/232* (2013.01); *B60R 21/235* (2013.01); *B60R 21/237* (2013.01); *B60R 21/2338* (2013.01); *B60R 21/23138* (2013.01); *B60R 2021/23382* (2013.01); *B60R 2021/23576* (2013.01)

(58) Field of Classification Search
CPC ............ B60R 21/232; B60R 21/23138; B60R 21/231; B60R 21/2338; B60R 21/237; B60R 21/213; B60R 2021/23384; B60R 2021/23382; B60R 2021/0048

USPC ................ 280/730.2, 743.1, 743.2
See application file for complete search history.

(56) References Cited

U.S. PATENT DOCUMENTS

| 8,789,846 | B2 * | 7/2014 | Wipasuramonton .. B60R 21/232 |
| | | | 280/730.2 |
| 8,876,153 | B2 * | 11/2014 | Dix ....................... B60R 21/233 |
| | | | 280/729 |
| 9,108,588 | B2 * | 8/2015 | Fukawatase .......... B60R 21/233 |
| 9,550,470 | B2 * | 1/2017 | Suk ....................... B60R 21/232 |
| 9,701,272 | B2 * | 7/2017 | Massa .................... B60R 21/232 |
| 2005/0206138 | A1 * | 9/2005 | Breuninger ........... B60R 21/231 |
| | | | 280/729 |
| 2014/0042732 | A1 * | 2/2014 | Taguchi ................ B60R 21/233 |
| | | | 280/729 |
| 2014/0203541 | A1 * | 7/2014 | Wei ....................... B60R 21/213 |
| | | | 280/730.2 |

(Continued)

FOREIGN PATENT DOCUMENTS

EP    1612110 A1    1/2006
JP    2008-001197 A    1/2008

(Continued)

*Primary Examiner* — Keith J Frisby
(74) *Attorney, Agent, or Firm* — Mintz Levin Cohn Ferris Glovsky and Popeo, P.C.; Peter F. Corless (57) ABSTRACT

A curtain airbag for a vehicle is provided. The curtain airbag includes a rear panel positioned toward a window of a vehicle, a front panel that longitudinally extends to have a length greater than a length of the rear panel, and the front panel is configured to interiorly fold and protrude a length the front panel exceeds the rear panel. An outer sewing line couples a boundary of the front panel and a boundary of the rear panel together while a protruded portion of the front panel folds in a backward orientation.

7 Claims, 5 Drawing Sheets

(56) References Cited

U.S. PATENT DOCUMENTS

| | | | | |
|---|---|---|---|---|
| 2015/0307053 A1* | 10/2015 | Jo | ........................ | B60R 21/232 |
| | | | | 280/730.2 |
| 2015/0307057 A1* | 10/2015 | Moon | .................... | B60R 21/232 |
| | | | | 280/728.2 |
| 2016/0023626 A1* | 1/2016 | Hiruta | ................... | B60R 21/232 |
| | | | | 280/728.2 |
| 2016/0229370 A1* | 8/2016 | Hampson | ............... | B60R 21/232 |
| 2016/0280178 A1* | 9/2016 | Kruse | ................... | B60R 21/232 |
| 2016/0288762 A1* | 10/2016 | Deng | .................. | B60R 21/0136 |
| 2017/0151925 A1* | 6/2017 | Kim | ...................... | B60R 21/232 |

FOREIGN PATENT DOCUMENTS

| | | |
|---|---|---|
| JP | 2012-158319 A | 8/2012 |
| KR | 2004-0079246 A | 9/2004 |
| KR | 2005-0076045 A | 7/2005 |
| KR | 10-2008-0017719 A | 2/2008 |
| KR | 10-2015-0094940 A | 8/2015 |
| WO | 2012-111073 A1 | 8/2012 |

* cited by examiner

A – A Section

FIG. 5

B – B Section

CURTAIN AIRBAG FOR VEHICLE

CROSS REFERENCE TO RELATED APPLICATION

The present application claims priority to Korean Patent Application No. 10-2015-0174749, filed Dec. 9, 2015, the entire contents of which is incorporated herein for all purposes by this reference.

BACKGROUND

Field of the Invention

The present invention relates to a curtain airbag for a vehicle, and more particularly, to a curtain airbag for a vehicle that prevents a driver of the vehicle from colliding with an a pillar of the vehicle in a diagonal collision of a vehicle.

Description of the Related Art

Recently, the importance of safety devices has increased due to a heightened interest in the safety of passengers in addition to functionality and convenience of a vehicle. Considering the available safety devices for protecting passengers, the airbag systems provide the most basic protective devices to disperse impacts to passengers during a vehicle collision. There are various types of airbag systems that provide protection during broadside collisions of vehicles in addition to head-on collisions of vehicles, such as side airbags or curtain airbags longitudinally installed along side windows of a vehicle. The airbag systems related to broadside collisions are generally classified into curtain airbags that protect a passenger's head and side airbags that protect a passenger's torso.

Generally, a curtain airbag cushion is longitudinally installed along a side roof panel of a vehicle. The curtain airbag is configured to expand between a door glass and a passenger when gas is introduced into the airbag cushion by an inflator. Thus, the heads of the passengers seated on front and rear seats are protected. However, the two-dimensional plane type of curtain airbags according to the related art cannot fully protect a driver during a diagonal collision of a vehicle. Accordingly, the driver may collide with an the pillar of the vehicle in a diagonal collision.

The above information disclosed in this section is intended merely to aid in the understanding of the background of the present invention, and therefore it may contain information that does not form the prior art that is already known in this country to a person of ordinary skill in the art.

SUMMARY

The present invention provides a curtain airbag for a vehicle that prevents the head of a driver from slipping between a driver airbag and a curtain airbag during a diagonal collusion of the vehicle. In particular, head of the driver may be prevented from colliding with an object such as the frame of the vehicle.

In one aspect an exemplary embodiment provides a curtain airbag for a vehicle that may include a rear panel positioned toward a side window of a vehicle, a front panel positioned toward an interior of a vehicle, the front panel longitudinally extends to have a length greater than a length of the rear panel. Further, a middle portion of the front panel may be interiorly folded and protrudes by a length the front panel exceeds the rear panel while a boundary of the front panel may be superimposed on a boundary of the rear panel. An outer sewing line may couple together the boundary of the front panel and the boundary of the rear panel while a protruded portion of the front panel may fold backward.

The protruded portion may be positioned behind an airbag of a driver seat when the curtain airbag is fully inflated. An upper end of the protruded portion may be inclined forward at an angle substantially equal to an inclination angle of a steering wheel of the vehicle.

The curtain airbag may further include a first sewing line positioned to be spaced forward and apart from the protruded portion by a predetermined distance and extends in an upward orientation and a downward orientation, and may be configured to restrict a forward expansion range of the protruded portion by coupling (e.g., fixing) the front panel and the rear panel together. The curtain airbag may further include a second sewing line positioned to be spaced and backward from the protruded portion by a predetermined distance and may extend in an upward orientation and in a downward orientation. The curtain airbag may be configured to restrict a backward expansion range of the protruded portion by coupling (e.g., fixing) the front panel and the rear panel together.

The protruded portion may include a forward side surface and a backward side surface divided based on a folded portion of the front panel. An inner tether that connects a base of the backward side surface to the rear panel may be disposed within the interior of the protruded portion, to allow the protruded portion to expand in an inclined backward direction. When the curtain airbag is fully inflated, the protruded portion may be positioned behind of a driver airbag and may be supported by the driver airbag, thus obtaining a support force. Accordingly, the curtain airbag for a vehicle may prevent the head of a driver from directly colliding with a frame of the vehicle during a diagonal collision of a vehicle, thus reducing an injury to the driver.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Advantages and features of the invention and methods of accomplishing the same may be understood more readily by reference to the following detailed descriptions of exemplary embodiments and the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Figure 1:
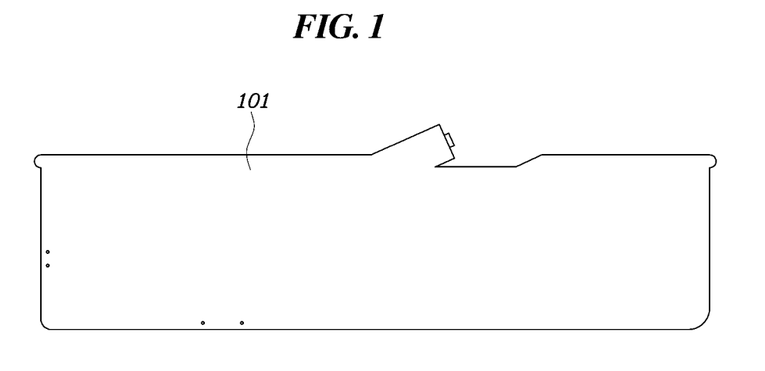
FIG. 1 is an exemplary view of a rear panel of a curtain airbag for a vehicle according to an exemplary embodiment of the present invention.
Figure 2:
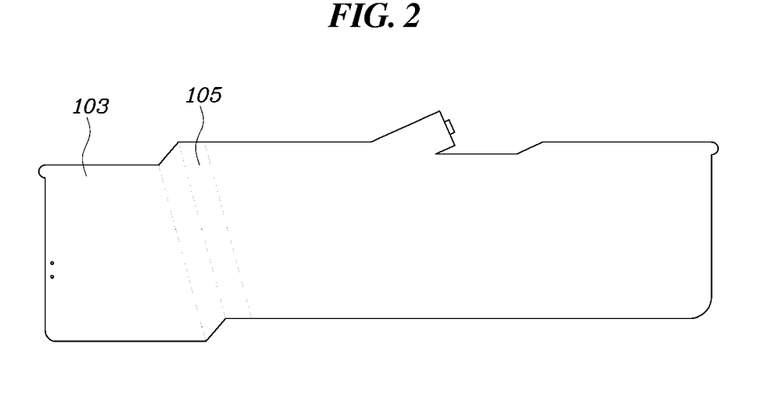
FIG. 2 is an exemplary view of a front panel of the curtain airbag for a vehicle according to an exemplary embodiment of the present invention.
Figure 3:
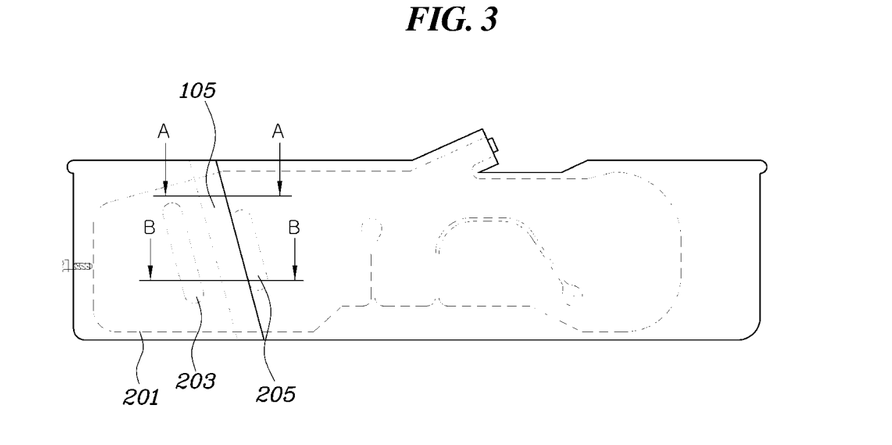
FIG. 3 is an exemplary view of the curtain airbag for a vehicle according to an exemplary embodiment of the present invention.
Figure 4:
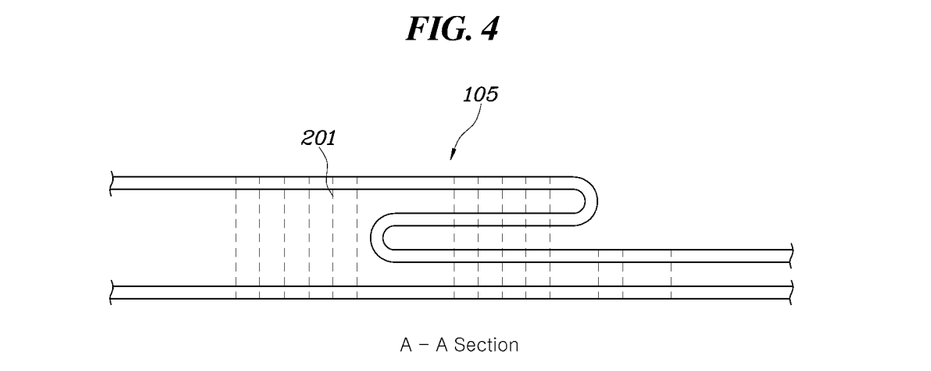
FIG. 4 is an exemplary sectional view taken along line A-A of FIG. 3 according to an exemplary embodiment of the present invention.
Figure 5:
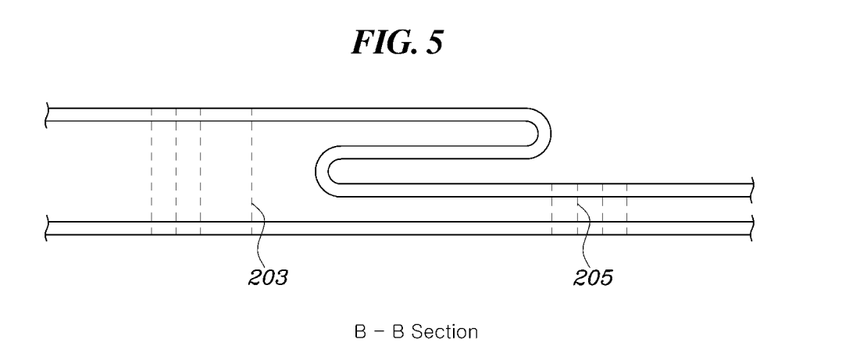
FIG. 5 is an exemplary sectional view taken along line B-B of FIG. 3 according to an exemplary embodiment of the present invention.
Figure 6:
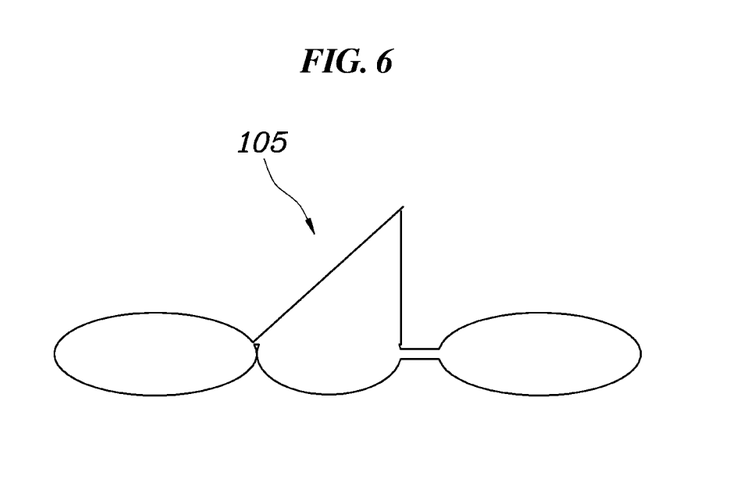
FIG. 6 is an exemplary schematic view of a protruded portion of the curtain airbag for a vehicle according to an exemplary embodiment of the present invention when the curtain airbag is fully inflated.
Figure 7:
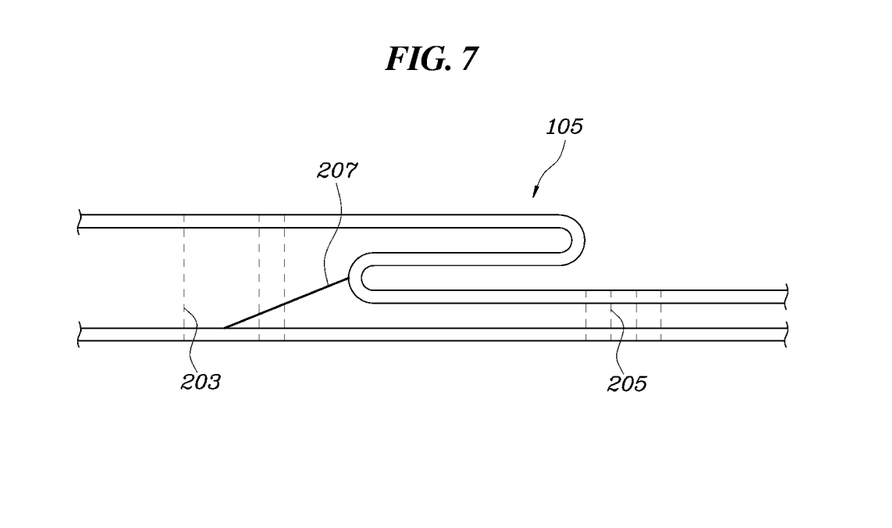
FIG. 7 is an exemplary sectional view taken along line B-B of FIG. 3 according to an exemplary embodiment of the present invention.
Figure 8:
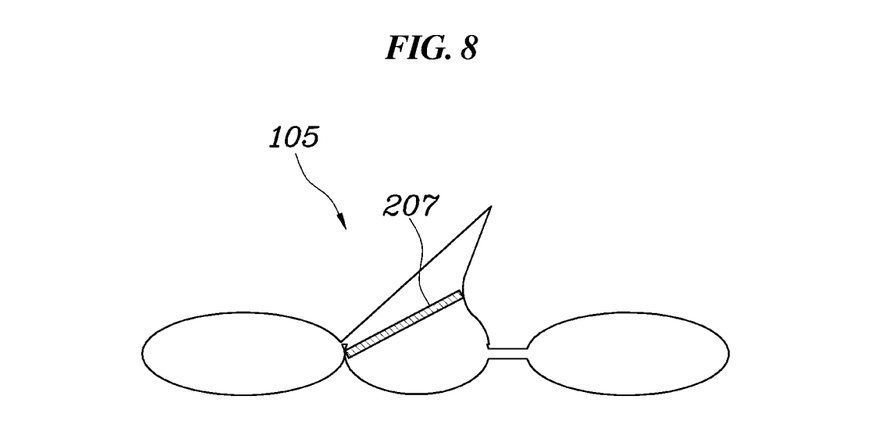
FIG. 8 is an exemplary schematic view of a protruded portion of a curtain airbag for a vehicle according to an exemplary embodiment of the present invention when the curtain airbag is fully inflated.
Figure 9:
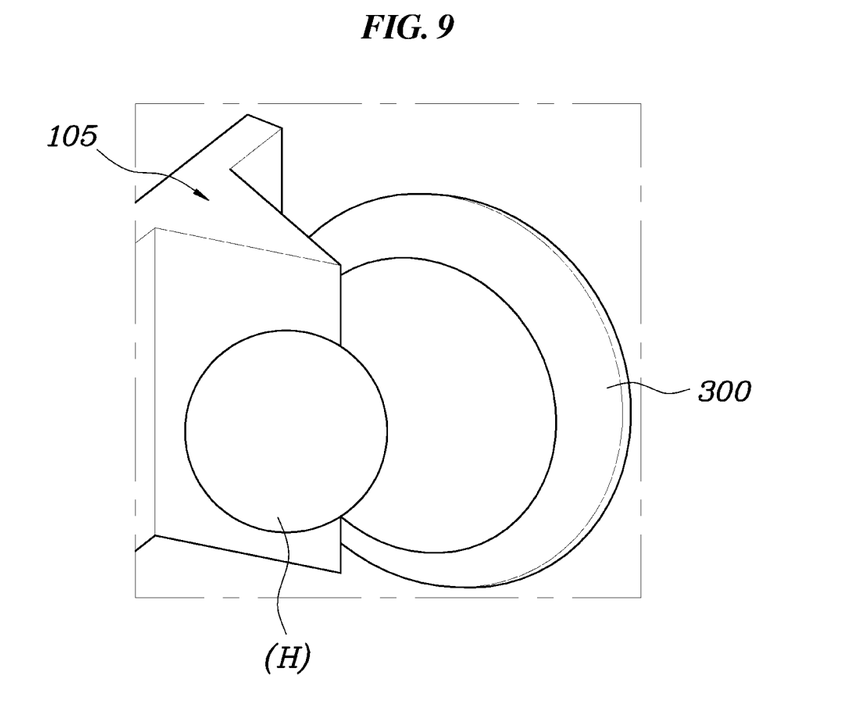
FIG. 9 is an exemplary conceptual view of a support structure provided between the curtain airbag of an exemplary embodiment the present invention and an airbag of a driver seat.

FIG. 1 is an exemplary view of a rear panel 101 of a curtain airbag for a vehicle according to an exemplary embodiment of the present invention. FIG. 2 is an exemplary view of a front panel 103 of the curtain airbag for a vehicle according to the exemplary embodiment of the present invention. FIG. 3 is an exemplary view of the curtain airbag for a vehicle according to the exemplary embodiment of the present invention. FIG. 4 is an exemplary sectional view taken along line A-A of FIG. 3. FIG. 5 is an exemplary sectional view taken along line B-B of FIG. 3. FIG. 6 is an exemplary schematic view of a protruded portion 105 of the curtain airbag for a vehicle according to the exemplary embodiment of the present invention when the curtain airbag is fully inflated. FIG. 7 is an exemplary sectional view taken along line B-B of FIG. 3 according to a second exemplary embodiment of the present invention. FIG. 8 is an exemplary schematic view of a protruded portion 105 of a curtain airbag for a vehicle according to the second exemplary embodiment of the present invention when the curtain airbag is fully inflated. FIG. 9 is an exemplary conceptual view of a support structure provided between the curtain airbag of the exemplary embodiment and an airbag 300 of a driver seat.

Particularly, the curtain airbag for a vehicle according to the present invention may include the rear panel 101 positioned toward a side window of a vehicle, the front panel 103 positioned toward an interior of a vehicle and the front panel may be configured to longitudinally extend to have a length greater than a length of the rear panel 101. The curtain airbag may be configured to have a middle portion of the front panel 103 may interiorly fold and protrudes by a length that the front panel 103 exceeds the rear panel while a boundary of the front panel 103 may be superimposed on a boundary of the rear panel 101. An outer sewing line 201 may couple the boundary of the front panel 103 and the boundary of the rear panel 101 together while a protruded portion of the front panel may fold in a backward direction. Although exemplary embodiments of the present invention are described below by focusing on the relation between the driver airbag and the curtain airbag to help understanding of the present invention, the present invention may be also applied to the relation between an airbag of a passenger seat and the curtain airbag in a similar manner.

Generally, a curtain airbag cushion may be longitudinally installed along a side roof panel of a vehicle, and the curtain airbag cushion may expand between door glass and passengers when gas is introduced by an inflator. In particular, the heads of the passengers seated on front and rear seats are protected. According to the related art, during a head-on collision or a broadside collision of a vehicle, passengers are protected by an existing curtain airbag and a driver airbag in front of the driver. However, during a diagonal collision of a vehicle, the driver may not be fully protected due to an unexpected movement of his or her head or body. More specifically, during a diagonal collision of a vehicle, the head of the driver may slip between the driver airbag and the curtain airbag, and the head of the driver may collide with an A pillar of a vehicle. Accordingly, the protruded portion 105 that protrudes from the curtain airbag toward an interior of a vehicle may be formed to prevent the head of the driver from slipping between the driver airbag and the curtain airbag, and may thereby provide additional protection to the head of the driver.

While the boundary of the front panel 103 may be configured to longitudinally extend to have the length greater than the length of the rear panel 101 that may be superimposed on the boundary of the rear panel 101 disposed toward a door glass of a vehicle. Further, the middle portion of the front panel 103 may fold interiorly and protrude by the length that the front panel 103 exceeds the rear panel 101. Further, when the protruded portion 105 of the front panel folds in a backward direction, the boundary of the front panel 103 and the boundary of the rear panel 101 may be coupled (e.g., fixed) together, and may form a tuck-in structure. Due to the tuck-in structure, when gas is supplied to the curtain airbag, a folded portion of the front panel 103 may expand and protrude. In other words, the tuck-in structure may protect (e.g., capture) the head of the driver during a diagonal collision of a vehicle. In particular, the head of the driver may be prevented from slipping between the driver airbag and the curtain airbag, and may thereby prevent the head of the driver from a collision with the A pillar of a vehicle.

The protruded portion 105 may be positioned behind the airbag 300 of the driver seat when the curtain airbag is fully inflated. An upper end of the protruded portion 105 may be inclined forward at an angle substantially equal to an inclination angle of a steering wheel of the vehicle. When the curtain airbag is fully inflated, the protruded portion 105 may be positioned behind of the driver airbag and supported by the airbag 300 of the driver seat and may provide a support force. For example, during a diagonal collision of a vehicle, the protruded portion 105 of the front panel 103 may capture (e.g., protect or restraint) the head of the driver, and may be primarily prevented from slipping between the airbag 300 of the driver seat and the curtain airbag.

However, during a diagonal collision of a vehicle, when the collision strength increases, the head of the driver may be more heavily loaded to the airbag. Accordingly, when the protruded portion 105 is not firmly fixed, the protruded portion may be pushed forward based on a head movement of the driver. As a result, the head of the driver may collide with the A pillar of a vehicle. Therefore, according to the present invention, the protruded portion 105 of the curtain airbag may be supported by the airbag 300 of the driver seat, when fully inflated. Accordingly, when the head of the driver is loaded to the protruded portion 105, the protruded portion may not be pushed forward, and the head of the driver may be captured (e.g., protected or restrained) by the protruded portion. Furthermore, the protruded portion may be formed at an angle substantially equal to the inclination angle of the steering wheel of the driver, and thus the support force may be stably obtained by the airbag 300 of the driver seat.

A first sewing line 203 may be positioned spaced apart and forward from the protruded portion 105 by a predetermined distance and may extend in an upward orientation and in a downward orientation (e.g., vertically). Further forward expansion range of the protruded portion 105 may be restricted by when the front panel 103 and the rear panel 101 are coupled together. A second sewing line 205 may be positioned backward and separated apart from the protruded portion 105 by a predetermined distance that extends (e.g., vertically) in an upward orientation and in a downward orientation, and may be configured to restrict a backward expansion range of the protruded portion 105 by coupling (e.g., fixing) the front panel 103 and the rear panel 101 together.

The protruded portion 105 may be formed to include a predetermined portion of the front panel 103 of the curtain airbag that protrudes, and the front panel 103 and the rear panel 101 may be coupled together. However, when an inclination angle formed between the protruded portion and the remaining front panel 103 is a gentle angle, the head of the driver may not be effectively captured (e.g., protected or restrained), and thus the head of the driver may be displaced along the protruded portion 105 due to the gentle inclination angle. Further, when volume of the protruded portion 105 increases a greater amount of gas may be required to fully inflate the protruded portion 105. Thus, the expansion speed of the protruded portion 105 may be reduced and an inflator capacity may need to be increased. Therefore, according to the present invention, the first sewing line 203 and the second sewing line 205 may be positioned at forward and backward locations of the protruded portion 105 respectively, and the inclination angle of the protruded portion 105 may be increased. Further, the expansion speed of the protruded portion 105 may be increased by restriction of the expansion volume of the protruded portion 105, and thus inflator capacity may not be required to be increased.

The protruded portion 105 may include a forward side surface and a backward side surface divided based on the folded portion of the front panel. An inner tether 207 that connects a base of the backward side surface to the rear panel 101 may be positioned within the interior of the protruded portion 105, and may allow the protruded portion 105 to expand in a backward inclined orientation. According to the present invention, when the protruded portion 105 expands, the incline of the protruded portion 105 may increase toward the driver by the connection of the base of the backward side surface to the rear panel 101 via the inner tether 207 positioned within the interior of the protruded portion 105, thereby more effectively capturing (e.g., protecting or restraining) the head of the driver.

While this invention has been described in connection with what is presently considered to be exemplary embodiments, it is to be understood that the invention is not limited to the disclosed exemplary embodiments. On the contrary, it is intended to cover various modifications and equivalent arrangements, without departing from the scope and spirit as disclosed in the accompanying claims.

What is claimed is:

1. A curtain airbag for a vehicle, comprising:
   a rear panel positioned adjacent to a side window of the vehicle;
   a front panel positioned within an interior of the vehicle, the front panel configured to longitudinally extend to have a length greater than a length of the rear panel, and a middle portion of the front panel configured to interiorly fold and protrude by a length that the front panel exceeds the rear panel while a boundary of the front panel is superimposed on a boundary of the rear panel; and
   an outer sewing line configured to couple the boundary of the front panel and the boundary of the rear panel together while a protruded portion of the front panel folds backward.

2. The curtain airbag of claim 1, wherein the protruded portion is positioned behind an airbag of a driver seat when the curtain airbag is inflated.

3. The curtain airbag of claim 2, wherein when the curtain airbag is inflated, the protruded portion is positioned behind of a driver airbag and supported by the driver airbag, via a support force.

4. The curtain airbag of claim 1, wherein an upper end of the protruded portion is inclined forward at an angle about equal to an inclination angle of a steering wheel of the vehicle.

5. The curtain airbag of claim 1, further comprising:
   a first sewing line positioned at a location spaced forward apart from the protruded portion by a predetermined distance that extends in vertically, and configured to restrict a forward expansion range of the protruded portion when the front panel and the rear panel are coupled together.

6. The curtain airbag of claim 1, further comprising:
   a second sewing line positioned at a location separated backward apart from the protruded portion by a predetermined distance that extends vertically and configured to restrict a backward expansion range of the protruded portion when the front panel and the rear panel are coupled.

7. The curtain airbag of claim 1, wherein
   the protruded portion includes a forward side surface and a backward side surface divided based on a folded portion of the front panel, and an inner tether that connects a base of the backward side surface to the rear panel positioned within the protruded portion, that allows the protruded portion to expand in an inclined backward orientation.

* * * * *